United States Patent [19]
Wickenhaver

[11] Patent Number: 5,235,756
[45] Date of Patent: Aug. 17, 1993

[54] PORTABLE COATING THICKNESS MEASURING DEVICE

[75] Inventor: Thomas A. Wickenhaver, W. Babylon, N.Y.

[73] Assignee: Grumman Aerospace Corporation, Bethpage, N.Y.

[21] Appl. No.: 933,228

[22] Filed: Aug. 21, 1992

[51] Int. Cl.$^5$ .............................................. G01B 7/06
[52] U.S. Cl. ........................................ 33/834; 33/832
[58] Field of Search ................................ 33/834, 832

[56] References Cited

U.S. PATENT DOCUMENTS

| | | | |
|---|---|---|---|
| 1,961,764 | 6/1934 | Horstkotte | 33/83 X |
| 2,664,640 | 1/1954 | Euverard | 33/83 X |
| 2,835,401 | 5/1958 | Vogel | 33/834 |
| 4,567,439 | 1/1986 | Koch | 33/834 |

FOREIGN PATENT DOCUMENTS 2638248  3/1978  Fed. Rep. of Germany ........ 33/834

Primary Examiner—William A. Cuchlinski, Jr.
Assistant Examiner—Alvin Wirthlin
Attorney, Agent, or Firm—Bacon & Thomas

[57] ABSTRACT

A readily portable, hand-held coating thickness measuring device which utilizes a pin to penetrate a coating and a gauge to accurately determine the thickness of the coating based on the degree of penetration is disclosed. The pin is formed at a tip of an elongated rod that can reciprocate relative to the body of the device is response to manually pivoting a trigger member. The device is particularly adapted to determine the thickness of coatings applied to metal surfaces. For this purpose, the device includes a signalling assembly to visually indicate to the user when the coating has been fully penetrated and the gauge should be read.

12 Claims, 2 Drawing Sheets

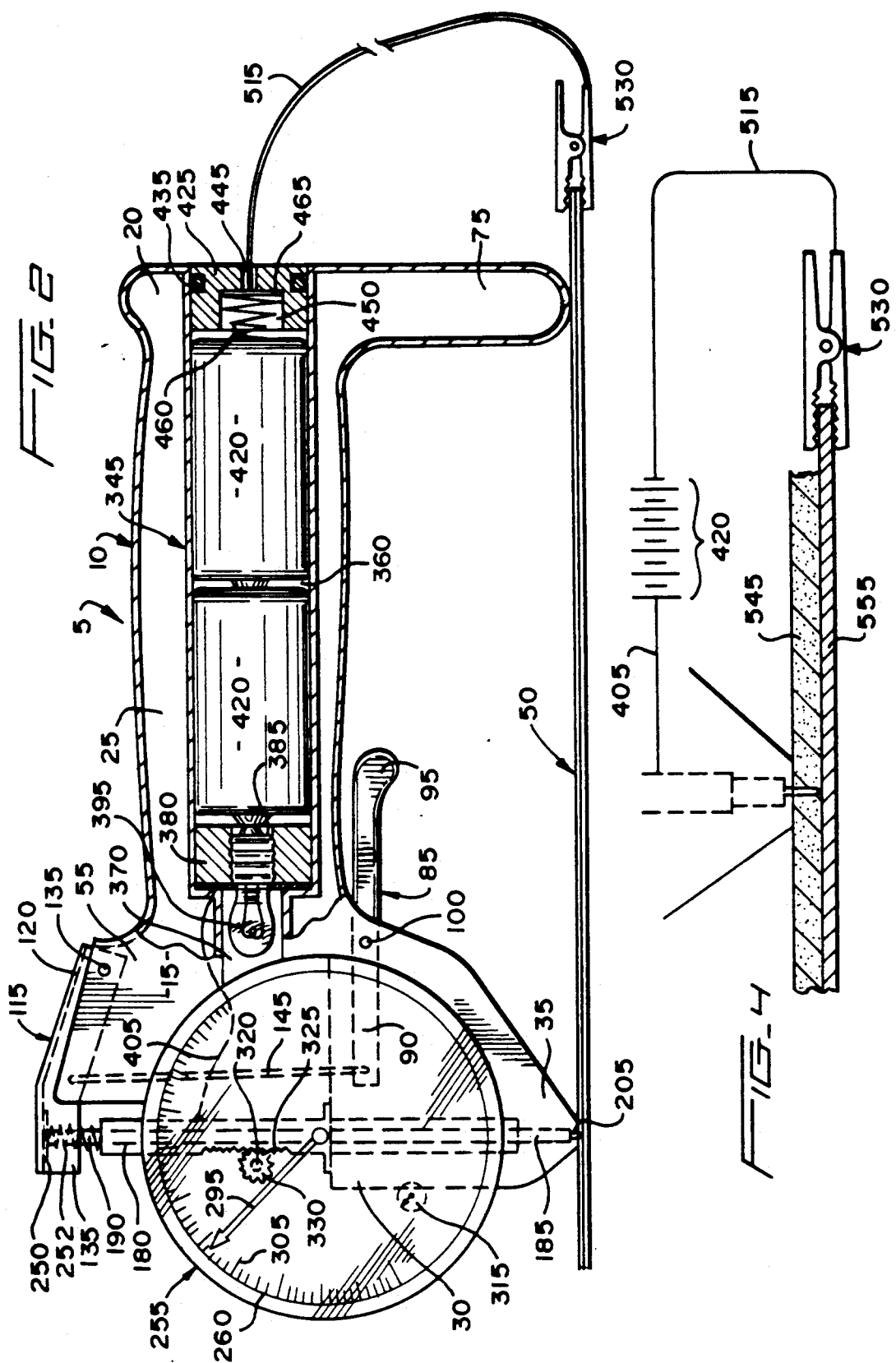

PORTABLE COATING THICKNESS MEASURING DEVICE

BACKGROUND OF THE INVENTION

1. Field of the Invention

The present invention pertains to a gauge for measuring the thickness of a coating applied to a surface and, more particularly, to a hand-held gauge for measuring the thickness of a coating applied to a metal surface which visually signals to the user the appropriate time at which to read a thickness gauge.

2. Background of the Invention

Various devices for measuring the thickness of a coating applied to a surface are known in the art as represented by U.S. Pat. Nos. 3,462,848, 4,567,436, 4,715,007 and 4,912,410. Each of these known gauge arrangements are particularly adapted to measure the thicknesses of coatings applied to metal surfaces in a manner similar to the present invention, but due to their construction and/or operation, they tend to be inaccurate, rather expensive to produce and/or not readily transportable.

For example, the gauge in U.S. Pat. No. 3,462,848 requires a base of a hand-held gauge body to be maintained in contact with the surface upon which the coating, whose thickness is to be measured, is applied while a cutter member is rotated. Maintaining the base of the gauge body in engagement is seen to be difficult due to the manner is which the gauge body can be grasped and the fact that the base is angled relative to the surface. Due to this angled base arrangement, when the cutter member is rotated, an arcuate groove, that increases in depth, will be placed in the surface. When the cutter member fully penetrates the coating and comes into contact with the metal surface, an electrical circuit will be completed and a light will illuminate to indicate to the user that the thickness of the coating can be read from a dial. Due to this measurement arrangement, not only is an undesirable groove placed in the surface, but the gauge cannot accurately read the coating thickness to a great degree of accuracy as the base can easily come out of engagement with the surface.

The thickness measuring gauge disclosed in U.S. Pat. No. 4,567,436, utilizes a magnetic sensing arrangement to determine the thickness of a coating applied to a metal surface. Although this gauge arrangement can be adequately positioned and supported on the surface to enable accurate readings, there exist numerous factors that can easily alter the accuracy of the unit and which significantly increase its cost. For instance, the magnetic field must be properly aligned by a set screw, the magnetic material must be manufactured to rather high purity levels, a balancing arm, which carries a magnetic thickness gauge, must be dynamically balanced and then the actual visual gauge must be calibrated using plates provided with various different known coating thicknesses. Due to the difficulty in calibrating this gauge, it is hard to justify transporting the unit for fear of a loss of accuracy.

U.S. Pat. No. 4,715,007 discloses an electromagnetic coating thickness sensing device wherein a probe is placed in contact with the coated surface and a generated electromagnetic field is sensed and converted to a coating thickness value. Although this device advantageously does not require any portion of the coating to be removed in order to measure its thickness, this arrangement does requires sophisticated electrical circuitry and components which undesirably add to the cost of the device.

Finally, the apparatus for measuring the thickness of an electrically nonconductive material on a metallic based disclosed in U.S. Pat. No. 4.912.410 utilizes an electrical measuring coil that is adapted to be supported over the surface by means of a constant pressure source of air supplied by nozzles. An electrical response is produced in the measuring coil from the metal which is dependent upon the distance which the measuring coil is maintained above the surface by the air pressure. This distance will depend on the thickness of the coating. Due to the construction of this system, the device is not readily transportable, is considered unduly complicated, and is rather expensive to manufacture and operate.

Therefore, there exists a need in the art for a coating thickness measuring device which is relatively inexpensive to manufacture, readily transportable, accurate and which does not unduly mar or damage the coating during use.

SUMMARY OF THE INVENTION

The present invention provides a readily portable, hand-held coating thickness measuring device which utilizes a pin to penetrate the coating and a feeler gauge to determine the thickness of the coating based on the degree of penetration. The device comprises a body member having first and second ends, both of which are adapted to rest upon a coated surface, interconnected by a gripping portion. The first end of the device slidably supports an elongated rod for reciprocal movement relative to the body member. One end of the elongated rod has a pin-like tip for penetrating the coating on the surface and its other end is adapted to be engaged by a member of a manually actuated lever assembly. The lever assembly includes a first lever which is pivotally attached, intermediate the ends thereof, to the body member, a second lever which is pivotally attached to the body member at one end and engages the elongated rod at its other end, and a connecting member which interconnects the first and second levers such that pivoting of the first lever causes pivoting of the second lever and sliding movement of the elongated rod relative to the body member.

The elongated rod is adapted to engage an actuation member of a conventional feeler gauge such that the amount of sliding movement of the elongated rod relative to the body member controls the position of at least one dial on the feeler gauge. In this manner, when the pin-like tip of the elongated rod fully penetrates the coating, the dial will provide an indication of the thickness of the coating.

The device of the present invention is particularly adapted to determine the thickness of coatings applied to metal surfaces. For this purpose, the device includes a signaling assembly to indicate to the user when the coating has been fully penetrated and the gauge should be read. In the preferred embodiment, the signaling assembly includes a luminous indicator (e.g. a light bulb) which is electrically connected to one terminal of a battery unit housed within the gripping portion of the body member. The other terminal of the battery unit is connected to an auxiliary wire which is adapted to be clipped onto the metal surface. In addition, the indicator or bulb is also electrically connected to the elongated rod. When the pin-like tip of the elongated rod fully penetrates the coating and engages the metal surface thereunder, an electrical circuit will be completed and the bulb will light.

These and other objects, features and advantages of the present invention will become more readily apparent from the following detailed description of a preferred embodiment of the invention when taken in conjunction with the drawings wherein like reference numerals refer to corresponding parts in the several views.

BRIEF DESCRIPTION OF THE DRAWINGS

FIG. 2 is a side view similar to that shown in FIG. 1 but wherein the inner structure of the device is depicted;

FIG. 4 shows an enlarged view of a portion of the device shown in FIG. 2.

DETAILED DESCRIPTION OF A PREFERRED EMBODIMENT

Figure 1:
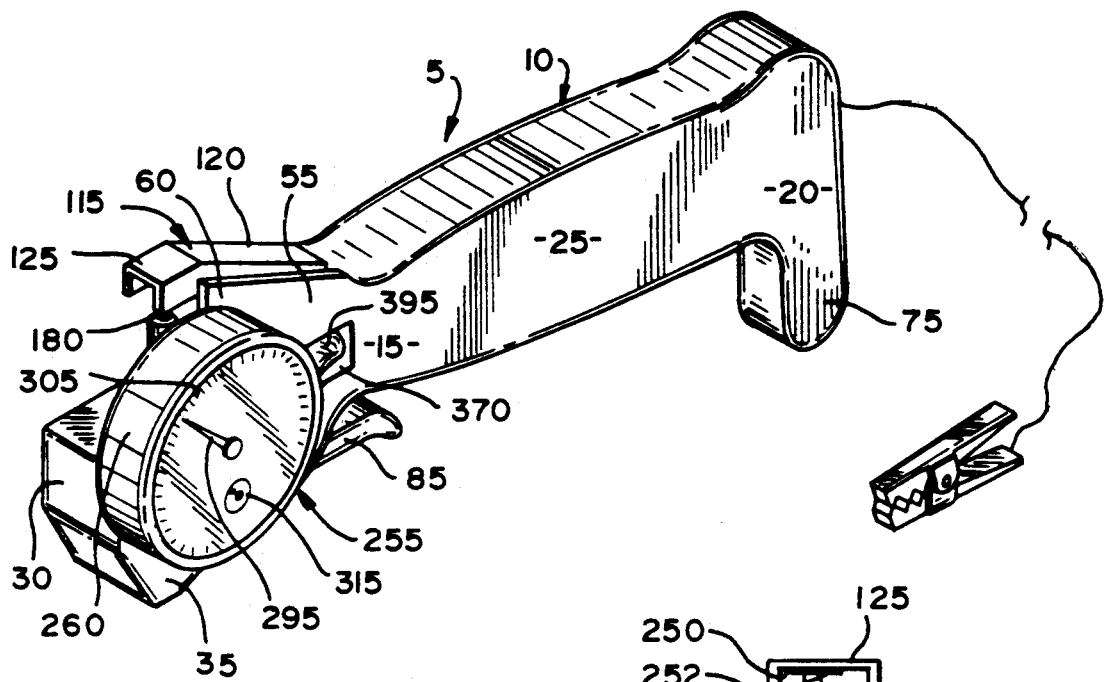
FIG. 1 is a perspective view of the coating thickness measuring device of the present invention.
Figure 3:
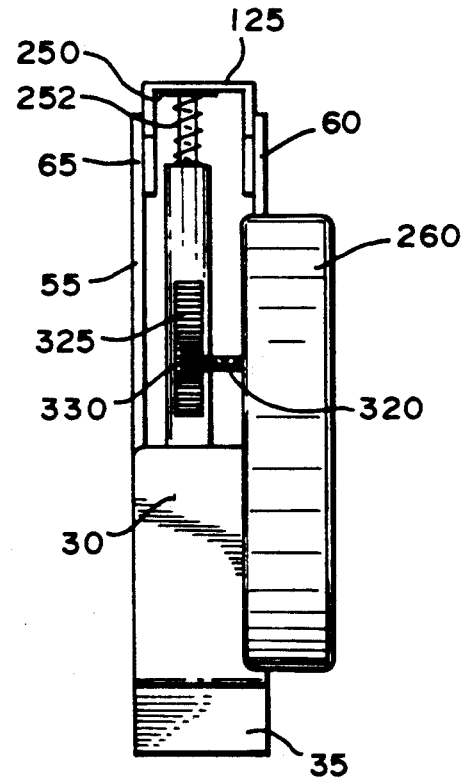
FIG. 3 is a front view of the device shown in FIG. 2.

Referring to FIGS. 1-3, the hand-held device for measuring the thickness of a coating applied to a surface of the present invention is generally indicated at 5. More specifically, device 5 comprises a body member 10 having a first end 15, a second end 20 and an intermediate gripping portion 25. First end 15, second end 20 and gripping portion 25 are preferably integrally formed from metal or plastic. First end 15 includes an anvil portion 30 having a lower end 35 adapted to engage a surface 50, preferably a metal surface having a coat of paint or other finish thereon, and an upper portion 55. Upper portion 55 includes bifricated upstanding flanges 60,65. Body member 10 further includes an extension portion 75 formed integral with second end 20. Extension portion 75 is also adapted to engage surface 50, along with lower end 35, to provide added stability in maintaining device 5 against surface 50 during use thereof as will be explained more fully below.

Device 5 further includes a trigger lever 85 having a first end 90 and a second end 95. Trigger lever 85 is pivotably connected, intermediate end 90 and 95, to first end 15 by means of a pin 100 and extends through a passage (not labeled) in first end 15 as best shown in FIGS. 2 and 3. An actuator lever 115 is adapted to be pivotably mounted between bifricated upstanding flanges 60,65 of upper portion 55. More specifically, actuator lever 115 includes a first end 120 and a second end 125 with first end 120 being pivotably mounted to bifricated upstanding flanges 60,65 by means of a pin 135. A connecting rod 145 is pivotably attached to first end 90 of trigger lever 85 and also to actuator lever 115 at a point remote from pivot pin 135.

Anvil portion 30 of body member 10 is provided with a longitudinal bore (not labeled) within which is located an elongated rod 180 for reciprocal movement therein. Elongated rod 180 includes a first end 185 and a second reduced diameter end 190. First end 185 terminates in a penetrating pin 205 and second end 190 is adapted to be engaged by second end 125 of actuator lever 115. In the preferred embodiment, second end 190 of elongated rod 180 is slidably received within a tubular housing 195, secured to anvil portion 30 by any means known in the art, and merely abuts actuator lever 115 but, from the following description of the invention, it should be readily apparent to one of ordinary skill in the art that elongated rod 180 could be fixedly secured to actuator lever 115 during operation of device 5. A washer 250 is secured to elongated rod 180, at a location above tubular housing 195, for reciprocal movement therewith and a spring 252 extends between an upper end of tubular housing 195 and washer 250 to bias elongated rod 180 upwards as shown in the drawings.

Device 5 is further provided with a sensing and indicating assembly, generally indicated at 255, which includes a dial indicating gauge 260. Dial indicating gauge 260 is of a type generally known in the art and includes a dial 295, various indicia 305 and a micro-dial 315. As is known in the art, dial indicating gauge 260 includes an input sensing shaft 320 which is adapted to be rotated upon linear movement of elongated rod 180. Rotation of shaft 320 is transmitted, through internal gauge gearing, to position dial 295 and micro-dial 315. The manner in which rotation of shaft 320 positions dials 295 and 315 is known in the art of feeler gauges and not considered part of the present invention so it will not be discussed in detail herein. The translation of the linear movement of elongated rod 180 into rotary movement of shaft 320 can be accomplished in many ways. According to a preferred embodiment of the invention, elongated rod 180 is integrally formed with a rack portion 325 which meshes with a pinion gear 330 secured to shaft 320. From the above description, it should be readily apparent that the indicia 305 on feeler gauge 260 provides distance measurements indicative of the distance in which penetrating pin 205 extends beyond lower end 35 of anvil portion 30 that can be read by the user of device 5. Micro-dial 315 likewise provides distance measurements and enables device 5 to permit coating thickness readings to one thousandths (1/1,000) of an inch.

Device 5 is particularly adapted for use in measuring the thickness of a coating applied to a metal surface. In order to signal to the user of device 5 when penetrating pin 205 is fully extended through the coating, a signaling assembly 345 is utilized which will now be described in detail. Body member 10 is provided with a central cavity 360 which extends from second end 20, through gripping portion 25 and terminates in a reduced diameter window area 370. Located within central cavity 360 is a block 380, preferably formed from metal, which includes a central bore 385. Central bore 385 is adapted to receive a light bulb 395, a portion of which extends into window area 370. Block 380 therefore engages a terminal of light bulb 395. A wire 405 is interconnected between block 380 and tubular housing 195 for elongated rod 180. At this point, it should be noted that block 380 may be made from various materials, including plastic. It is only important that wire 405 contact one of the two terminals of light bulb 395. With this connection arrangement, wire 405 will be electrically connected to elongated rod 180 through tubular housing 195, spring 252 and washer 250, all of which are formed from electrically conductive materials.

Further located within central cavity 360 is a pair of batteries 420. One terminal of batteries 420 is adapted to be engaged with the other terminal of light bulb 395, i.e., the terminal of light bulb 395 to which wire 405 is not connected. Batteries 420, block 380 and light bulb 395 are enclosed within central cavity 360 by means of an end cap 425. End cap 425 may be secured to second end 20 of body member 10 by means known in the art and is preferably threaded within central cavity 360. End cap 425 includes an annular seal 435 to prevent the ingress of contaminants into central cavity 360. End cap 425 further includes a central bore 445 that opens into an enlarged bore 450. A compression spring 460 is adapted to be located within enlarged bore 450 and extend between a washer 465 located in enlarged bore 450 and a battery 420. One end of a wire 515 is secured to washer 465 and the other end of wire 515 has secured thereto a clip 530. Clip 530 is of the type generally known in the art and includes a pair of pivotably interconnected electrical alligator clamp members (not labeled) which are spring biased to a closed or engaged position.

Referring to FIG. 4, it can readily be seen that lower end 35 of anvil portion 30 is engaged with a surface which includes a coating layer 545 applied to a base metal surface 555. It is the thickness of coating layer 545 that device 5 of the present invention is adapted to measure.

With reference to each of the figures, the operation of device 5 will now be explained. First of all, device 5 is adapted to be manipulated by one hand of a user by means of gripping portion 25. When device 5 is not being used, spring 245 will bias elongated rod 180 and second end 125 of actuator lever 115 upward as shown in FIGS. 1-4. Actuator lever 115 will therefore be pivoted about pin 135 causing trigger lever 85 to pivot about pin 100 by means of connecting rod 145. During use, device 5 is positioned relative to a surface such that lower end 35 of anvil portion 30 engages the surface along with extension portion 75. Lower end 35 and extension portion 75 are arranged such that when they are maintained against a surface, elongated rod 180 and penetrating pin 205 reciprocate substantially perpendicular to that surface. At this point, the user of device 5 can cause pivoting of trigger lever 85 about pin 100 which causes penetrating pin 205 to penetrate coating layer 545 through connecting rod 145, actuator lever 115 and elongated rod 180. As soon as penetrating pin 205 fully extends through coating layer 545 it will engage base metal 555. At this time, an electrical circuit of signalling assembly 345 will be completed and will cause light bulb 395 to illuminate. When seeing the illumination of light bulb 395, the user of device 5 will know that it is time to read dial indicating gauge 260 to determine the accurate thickness of coating layer 545.

Although described with respect to a preferred embodiment of the invention, it should be readily apparent that various changes and/or modifications may be made to the invention without departing from the spirit thereof. In general, the invention is only intended to be limited by the scope of the following claims.

I claim:

1. A hand-held device for measuring the thickness of a coating applied to a surface comprising:

a body member including first and second ends with a hand gripping portion therebetween, said first end including an anvil portion having a lower end that is adapted to engage a surface which has a coating, the thickness of which is to be measured, and an upper end;

means for penetrating the coating to be measured, said penetrating means comprising an elongated rod having first and second ends with the first end of said elongated rod terminating in a sharp, pin-like tip, said rod being mounted to said first end of said body member for reciprocal movement relative thereto with said pin-like tip being adapted when moved to extend beyond the lower end of said anvil portion in order to penetrate the coating to be measured;

means for selectively, forcibly shifting said elongated rod relative to said body member so that said pin-like tip of said elongated rod protrudes beyond the lower end of said anvil portion, said shifting means comprising lever means pivotally mounted to said body member, one portion of said lever means defining a trigger portion which extends adjacent to said hand gripping portion so as to be maually manipulatable to pivot said lever means and a second portion of said lever means defining an actuator member which engages said elongated rod to shift said elongated rod relative to said body member in response to pivoting of said lever means by said trigger portion; and means for sensing and indicating the distance said pin-like member protrudes beyond the lower end of said anvil portion such that when the lower end of said anvil portion is engaged with a surface having a coating whose thickness is to be measured and said elongated rod is forced to shift relative to said body member by said shifting means, the distance sensed by said indicating means will represent the thickness of the coating applied to the surface and this distance will be indicated to a user of the device.

2. A hand-held measuring device as claimed in claim 1, wherein the second end of said body member includes an extension which is also adapted to engage the surface, along with the lower end of said anvil portion, in order to stabilize said body member during use.

3. A hand-held measuring device as claimed in claim 2, wherein said pin-like tip is adapted to penetrate a coating substantially perpendicular to the surface upon which the coating is on.

4. A hand-held measuring device as claimed in claim 1, wherein said lever means comprises a first lever pivotally mounted, intermediate first and second ends thereof, to said body member, a second lever pivotally mounted to said body member and a connecting member extending between the first end of said first lever and said second lever at a predetermined distance from the pivot location of said second lever to said body member, the second end of said first lever defining said trigger portion and said second lever defining said actuator member such that pivoting of said first lever causes pivoting of said second lever, through said connecting member, and shifting of said elongated rod relative to said body member.

5. A hand-held measuring device as claimed in claim 4, wherein said second end of said elongated rod is fixedly secured to said actuator member.

6. A hand-held measuring device as claimed in claim 5, further including means for biasing said elongated rod toward said second lever.

7. A hand-held measuring device as claimed in claim 1, wherein said sensing and indicating means comprises a gauge attached to said body member, said gauge including an input sensing member interconnected with said elongated rod for movement therewith such that movement of said elongated rod relative to said body member by said shifting means causes said input sensing member to transmit a distance signal to said gauge.

8. A hand-held measuring device as claimed in claim 1, wherein said elongated rod is metal.

9. A hand-held measuring device as claimed in claim 8, further including means for signalling when a coating on a metal surface has been fully penetrated, said signalling means comprising a source of electrical power with positive and negative terminals, an electrically operated indicating unit electrically connected to one of said positive and negative terminals, a first electrical conduit connecting said indicating unit to said elongated rod, and a second electrical conduit connected to the other of said positive and negative terminals of said source of electrical power at one end thereof and having a second end adapted to be placed in contact with the metal surface upon which the thickness of a coating is to be measured such that when said pin-like tip fully penetrates the coating and engages the metal surface, an electrical circuit between the source of electrical power and the indicating unit will be completed whereby the indicating unit will be activated so as to indicate to the user of the measuring device that the coating has been fully penetrated.

10. A hand-held measuring device as claimed in claim 9, wherein said source of electrical power is housed within the hand gripping portion of said body member.

11. A hand-held measuring device as claimed in claim 10, wherein the second end of said second electrical conduit includes a clip for readily attaching said second electrical conduit to a metal surface.

12. A hand-held measuring device as claimed in claim 10, wherein said indication unit comprises a luminous indicator.

* * * * *